(12) United States Patent
Budni et al.

(10) Patent No.: US 12,265,597 B2
(45) Date of Patent: Apr. 1, 2025

(54) DIGITAL RIGHTS MANAGEMENT SYSTEM RESOURCE MANAGER

(71) Applicant: ARRIS Enterprises LLC, Suwanee, GA (US)

(72) Inventors: Santosh Basavaraj Budni, Bangalore (IN); Vinod Jatti, Bangalore (IN); Nithin Raj Kuyyar Ravindranath, Bangalore (IN); Kiran Tovinkere Srinivasan, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 512 days.

(21) Appl. No.: 17/157,243

(22) Filed: Jan. 25, 2021

(65) Prior Publication Data

US 2021/0240801 A1 Aug. 5, 2021

Related U.S. Application Data

(60) Provisional application No. 62/969,547, filed on Feb. 3, 2020.

(51) Int. Cl.
*G06F 9/445* (2018.01)
*G06F 21/10* (2013.01)
(Continued)

(52) U.S. Cl.
CPC ............ *G06F 21/123* (2013.01); *G06F 9/445* (2013.01); *G06F 21/10* (2013.01); *G06F 21/53* (2013.01)

(58) Field of Classification Search
CPC ............ G06F 2201/865; G06F 11/302; G06F 11/3419; G06F 11/3423; G06F 21/604; G06F 9/50; G06F 9/5061; G06F 9/5077; G06F 11/3003; G06F 11/3476; G06F 8/4441; G06F 9/445; G06F 9/44578; G06F 9/4881; G06F 9/5027; G06F 9/5011; G06F 2209/5019; G06F 2209/508; H04L 67/535; H04L 67/62
See application file for complete search history.

(56) References Cited

U.S. PATENT DOCUMENTS

| 8,112,755 | B2 * | 2/2012 | Apacible | G06F 9/5011 |
| | | | | 718/104 |
| 2008/0172668 | A1 * | 7/2008 | Tzruya | G06F 9/5088 |
| | | | | 718/101 |

(Continued)

OTHER PUBLICATIONS

Thierry Monteil. Coupling profile and historical methods to predict execution time of parallel applications . Parallel and Cloud Computing, 2013, 2 (3), pp. 81-89 (Year: 2013).*

*Primary Examiner* — Zhimei Zhu
(74) *Attorney, Agent, or Firm* — Wenderoth, Lind & Ponack, L.L.P.

(57) ABSTRACT

A system and method for managing resources of a processor is disclosed. In an illustrative embodiment, the method includes accepting a command to execute an application at least in part by the processor, executing the application using the processor, monitoring execution parameters characterizing the execution of the application by the processor, and storing the monitored execution parameters in a memory accessible to processor. In one example, the execution parameters including an identifier of the application and a time at which the application begins execution.

27 Claims, 7 Drawing Sheets

(51) Int. Cl.
    *G06F 21/12*    (2013.01)
    *G06F 21/53*    (2013.01)

(56) References Cited

U.S. PATENT DOCUMENTS

| | | | | |
|---|---|---|---|---|
| 2010/0057905 | A1* | 3/2010 | Enscoe | G06F 11/3055 709/224 |
| 2012/0096455 | A1* | 4/2012 | Katsumata | G06F 9/45558 717/177 |
| 2012/0324481 | A1* | 12/2012 | Xia | G06F 9/485 719/320 |
| 2013/0173513 | A1* | 7/2013 | Chu | G06F 9/451 706/14 |
| 2013/0305392 | A1* | 11/2013 | Bar-El | H04L 63/0823 726/29 |
| 2014/0372356 | A1* | 12/2014 | Bilal | G06N 5/02 706/46 |
| 2015/0193239 | A1* | 7/2015 | Dolph | G06F 1/3212 713/100 |
| 2015/0358301 | A1* | 12/2015 | Dalbehera | G06F 21/57 713/171 |
| 2016/0006724 | A1* | 1/2016 | Vlot | G06F 21/72 713/156 |
| 2016/0070887 | A1* | 3/2016 | Wu | G06F 21/74 713/189 |
| 2016/0162858 | A1* | 6/2016 | Winograd | G06Q 20/1235 705/51 |
| 2018/0191507 | A1* | 7/2018 | Blankenbeckler | H04N 21/4344 |
| 2019/0138919 | A1* | 5/2019 | Chen | G06F 9/445 |
| 2019/0370603 | A1* | 12/2019 | Chen | G06F 9/445 |
| 2021/0200882 | A1* | 7/2021 | Maor | G06F 16/71 |

* cited by examiner

DIGITAL RIGHTS MANAGEMENT SYSTEM RESOURCE MANAGER

BACKGROUND

1. Field

The present disclosure relates to systems and methods for processing media content and in particular to a system and method for managing resources associated with the management of digital rights associated with the presentation of such media content.

2. Description of the Related Art

The distribution of media content such as video programs is typically controlled by Digital Rights Management (DRM) systems so that the reception and/or presentation of such media content is limited to only authorized entities.

DRM systems are themselves subject to compromise by those wanting to acquire access to the media content without authorization. Accordingly, it is important that such DRM systems and they use be protected from compromise. As a consequence, many such systems perform cryptographic and related operations in a trusted execution environment (TEE).

Such TEE environments may be implemented by the use of a "secure" processor running its own operating system and having its own memory that cannot be accessed (written to and/or read from) by the general processor used for non-secure operations. Alternatively, the TEE environment may be implemented by use of a generic processor and "rich" operating system (OS), but with specific commands only permitted to run on a secure OS instead of the rich OS. This secure OS is smaller and more confined than the rich OS, and may for example (1) permit only particular applications to be run by the secure OS, (2) restrict read and/or write operations to secure memory to only particular applications and only via the secure OS, or (3) permit only a certain limited set of operations to be performed.

DRM technology keeps evolving and hardware (SoC) manufactures keeps adopting or upgrading the hardware capability. As the hardware prices are competitive, device manufactures try to optimally balance 'device capability' Vs 'cost of device'. Based the device functional features or use cases, device vendors accordingly select the hardware components.

Many devices contain DRM security components inbuilt in hardware (for example, secure memory). Major hardware vendors typically configure the security hardware components and provide interface to control and use security features. Currently the hardware security features are configured/loaded and reserved based on device features aimed at generic or default customer usage. Examples of such hardware security components include trusted applications and key slots. These security components are pre-configured or loaded as per generic customer need or usage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for managing resources of a processor. In one embodiment, the method includes accepting a command to execute an application at least in part by the processor, executing the application using the processor, monitoring execution parameters characterizing the execution of the application by the processor, and storing the monitored execution parameters in a memory accessible to processor. In one example, the execution parameters including an identifier of the application and a time at which the application begins execution.

Another embodiment is evidenced by an apparatus for receiving content and providing content for presentation, including: a processor and a memory communicatively coupled to the processor. The memory stores processor instructions including processor instructions for: accepting a command to execute an application for providing the content for presentation, the application executed at least in part by the processor, executing the application using the processor, monitoring execution parameters characterizing the execution of the application by the processor, and storing the monitored execution parameters in the memory.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

That CPE devices 108 have limited resources gives rise to a number of issues. A first issue is that reserving hardware security resource per application or feature might cause resource exhaust leading to problems like 'service unavailability' or stability issues. For example, consider the case of YOUTUBE content playback failing on consumer premises equipment (CPE), with the root cause of this failure that the restricted secure memory that is shared by all active Trusted Applications is being over-utilized, leading to the out-of-memory condition. Similarly, the playback application provided by NETFLIX is a trusted application which preconfigures security components for a quick launch when user attempts to play content. If such components are unavailable, an error message will result and playback will not commence.

A second issue is that the launch of a playback application or content playback itself might be slowed or delayed when the CPE 108 is not configured as per customer daily usage patterns. This is because unused trusted applications (TAs) are holding the resources.

A third issue is that unmanaged or reserved resources per trusted application makes resource to be idle/unused and limit the total trusted applications to be supported on device.

A system, apparatus, and method for configuration and loading of security components based on customer daily usage patterns is discussed below. Daily customer use case patterns vs hardware (and software) security units are determined and are customized and configured as per use case. Further, DRM security resource settings are initialized from predicted the customer use case patterns. This provides for faster launching of applications (as required processor resources are invoked in advance), reduced hardware costs (as fewer resources are required to support reasonable customer use patterns), more efficient use of hardware resources (particularly secure memory space) reduced stability issues related to a shortage of secure processor resources (e.g. instabilities due to exhaustion of secure memory), and the ability to support a greater number of trusted applications on the same device. Further, this approach can be applied to a wide variety of CPE devices 108 with security components and can be implemented on existing devices without hardware modifications.

Figure 1:
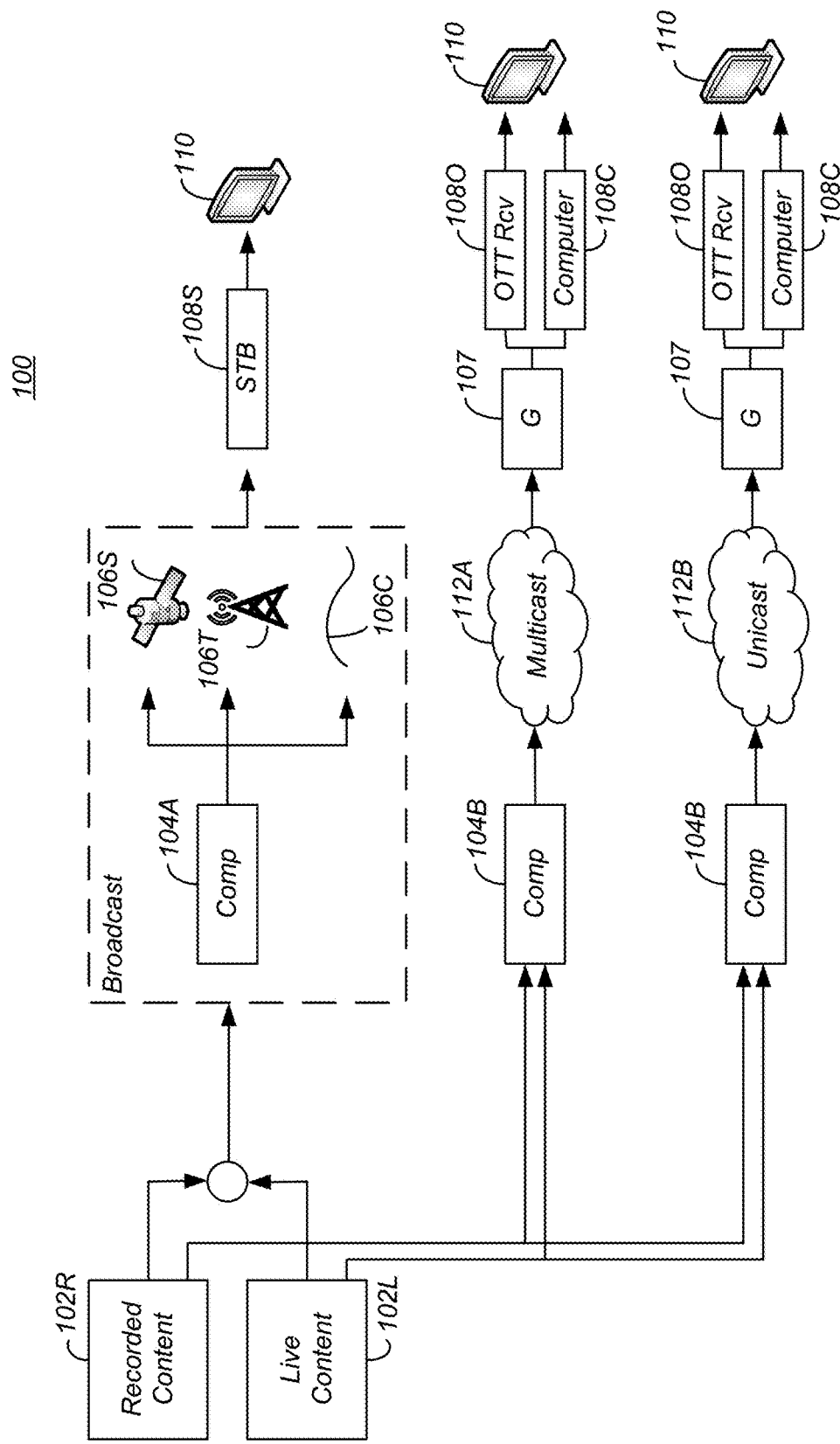
FIG. 1 is a diagram of embodiments of media content dissemination system.

FIG. 1 is a diagram of embodiments of media content dissemination system 100. Depicted is the provision of recorded content 102R and/or live content 102L (alternatively referred to simply as content or media content 102 that is presented for transmission to CPEs disposed where the media content is to be presented and consume.

Such media content 102 may be disseminated by means of traditional broadcast as shown in the upper portion of FIG. 1. In this case, the media content 102 is compressed by compression module 104A and provided to a broadcast transmission element such as a satellite 106S, a terrestrial transmitter 106T, a cable transmission system 106C or similar broadcast element (individually or collectively referred to hereinafter as simply broadcast element(s) 106). Compression may be performed according to a number of different protocols depending on the application, including MPEG (Motion Pictures Expert Group), HEVC (High Efficiency Video Coding), and (others). The broadcast media content is received by customer premises equipment (CPE) 108 such as a set top box 108S, which receives a selected channel of the media content, decrypts the content (if encrypted) and decompresses the decrypted content and provides the decrypted and decompressed content to a display 110 for consumption by the user. STBs 108S are typically provided to consumers subscribing to the broadcast service by the broadcaster.

The media content 102 may also be disseminated by means for a managed Internet Service provider (ISP_/Telco network. In this case, the media content is compressed by compression module 104B using analogous compression protocols, which may also include Internet Protocol Television, and provided for multicasting via Reliable Multicast Protocol (RMPT), Internet Group Management Protocol (IGMP), Real Time Transport Protocol (RTP), Session Initiation Protocol (SIP), or similar. Transmission is performed via the Internet multicast 112A, by fiber, digital subscriber line (DSL) or similar means over channels with reserved bandwidth and admission control. The transmitted media content 102 is received by a CPE 108 such as computer 108C or similar device (e.g. smartphone, tablet or laptop), an over the top (OTT) receiver 108O, or a hybrid STB that includes an OTT receiver 108O (not illustrated), optionally through a gateway 107. The CPE 108 receives the media content 102, decompresses the media content 102, and decrypts the media content (if encrypted), and provides the resulting signal to display 110.

The media content 102 may also be disseminated by means of an unmanaged network using OTT techniques. Typically, this is performed by using an adaptive streaming server to unicast streams under the HTTP protocol on a best effort basis. Such transmission is performed via Internet unicast 112B by fiber optic, or wireless means such as LTE (Long Term Evolution), or Wi-Fi. Adaptive streaming techniques are typically utilized. Such techniques include MICROSOFT Smooth Streaming, APPLE HTTP Adaptive Bitrate Streaming, Adobe HTTP Dynamic Streaming or Live Adaptive Streaming. The CPE 108 receives the media content 102, decompresses and decrypts (if encrypted) the media content 102, and provides the resulting signal to the display 110.

Figure 2:
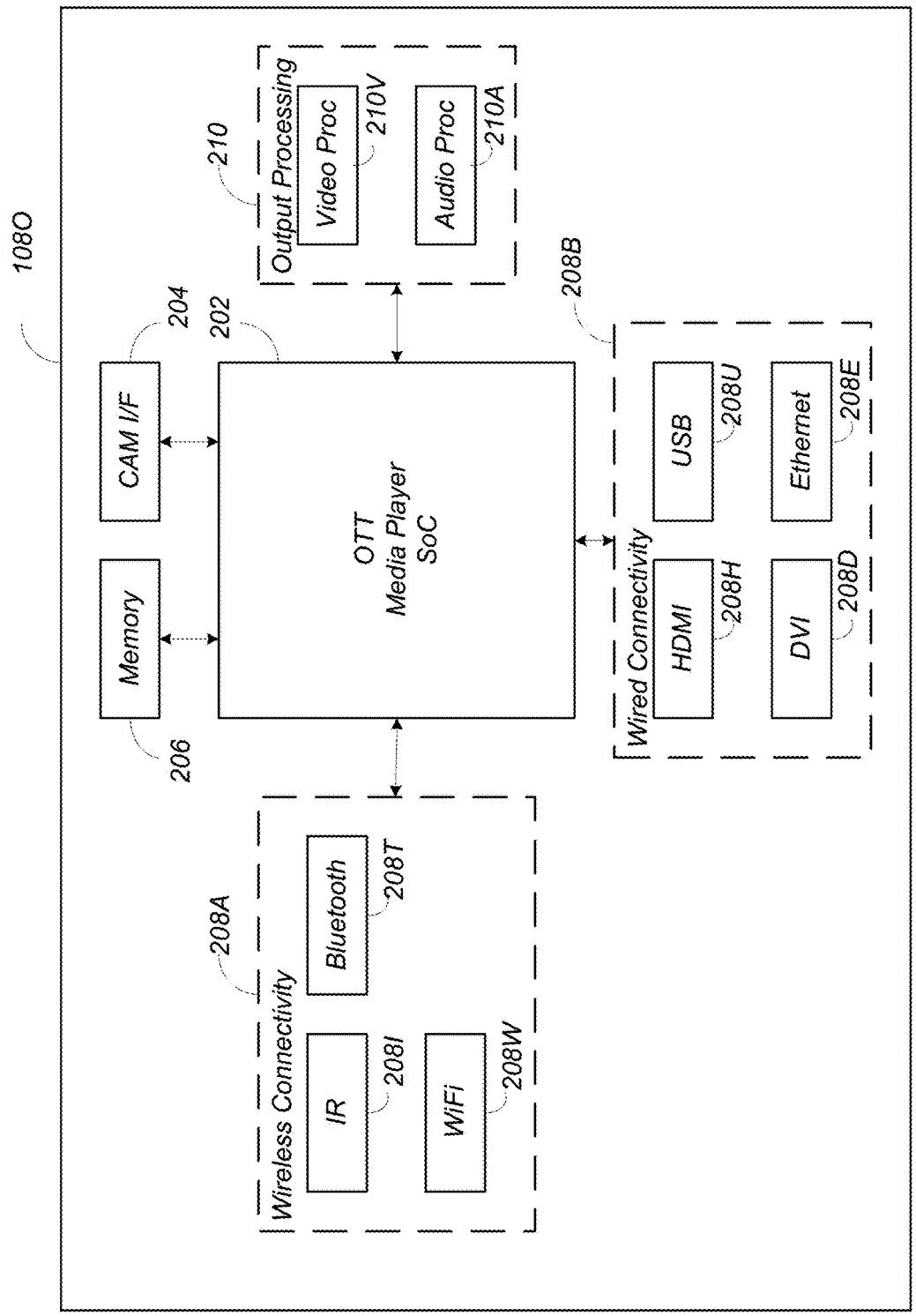
FIG. 2 is a diagram illustrating an exemplary OTT receiver.

FIG. 2 is a diagram illustrating an exemplary OTT receiver 108O, alternatively referred to hereinafter simply as receiver 108O. The receiver 1008O is implemented primarily by an OTT media player system on a chip (SoC) 202, further described below. The receiver 108O also comprises an OTT receiver memory 206 and interfaces with a conditional access module (CAM, not illustrated) via a CAM interface 204 communicatively coupled with the SoC 202 to implement one or more conditional access application. The CAM can be a smartcard or other secure device that performs selected security operations for the OTT receiver 108O. Such CAMs are typically provided to subscribing customers by the broadcaster.

The OTT receiver 108O includes a number of other elements implementing wireless connectivity 208A and wired connectivity 206B with external elements. For example, wireless connectivity elements can include an IR element 208I that is used to communicate with a remote control via infrared transmission. Similarly, the wireless connectivity elements may include Bluetooth element 208T for communicating data and commands with an external Bluetooth enabled device, and a Wi-Fi element 208W for communicating data and commands with an external Wi-Fi enabled device. The OTT receiver 108O also includes wired connectivity elements allowing communication via HDMI (High Definition Multimedia Interface) element 208H, USB element 208U, digital visual interface (DVI) element 208D and Ethernet element 208E.

The OTT receiver 108O may also further comprise output processing elements 210, including a video processor 210V and an audio processor 210A. Such video and audio processing may include D/A conversion and amplification, if these functions are not performed by the SoC 202.

Figure 3:
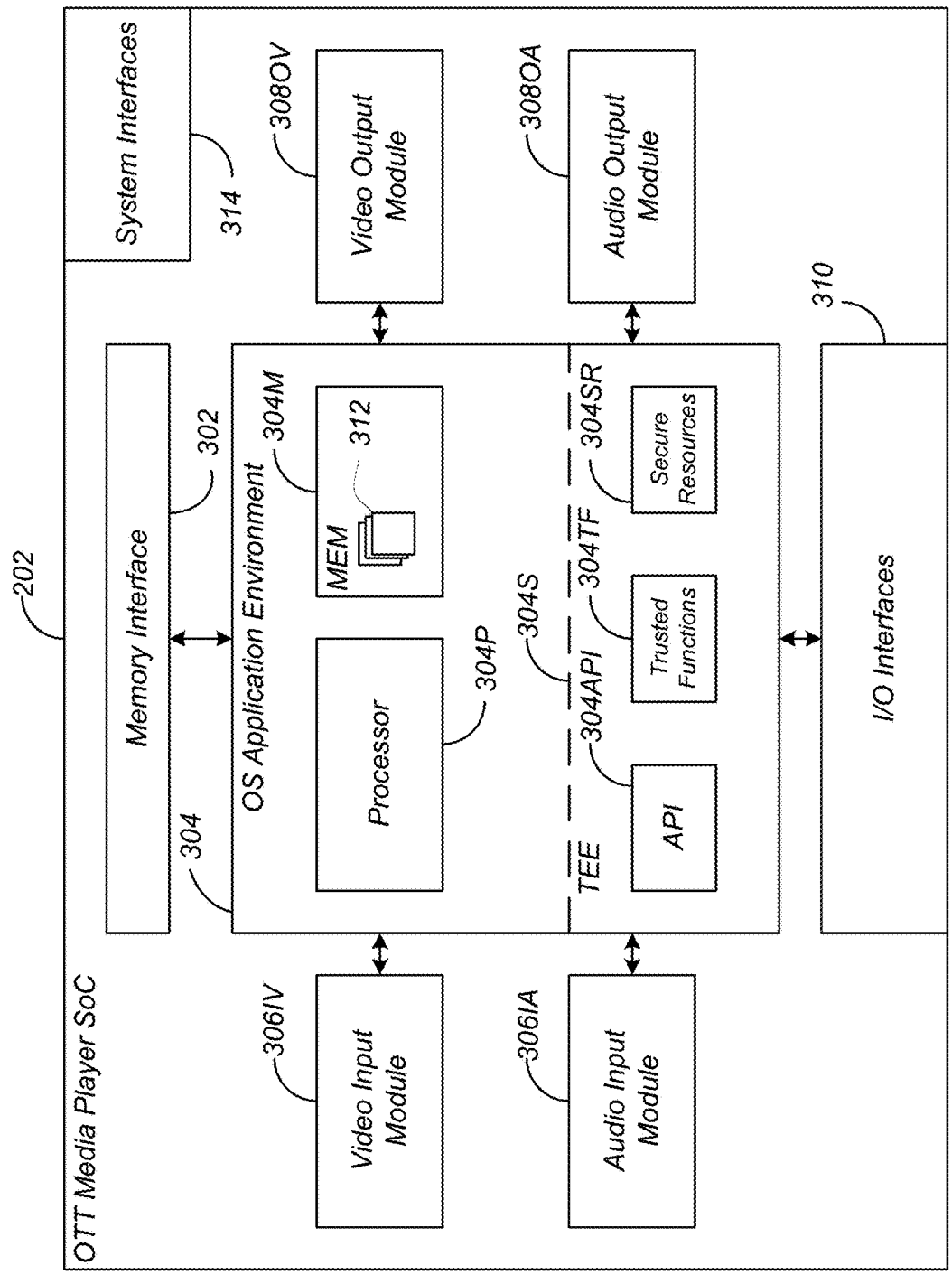
FIG. 3 is a diagram depicting a block diagram of an exemplary embodiment of the SoC.

FIG. 3 is a diagram depicting a block diagram of an exemplary embodiment of the SoC 202. The SoC 20 includes an operating system (OS) application environment 304 that is communicatively coupled to a video input module 306IV, and audio input module 306IA, a video output module 308OV and audio output module 308OA. The application environment 304 is also communicatively coupled to an I/O interface, a memory interface 302, and system interfaces 314.

I/O interfaces 310 may include, for example, interfaces to the wireless 208A and wired 208B connectivity interfaces illustrated in FIG. 2. The memory interface 302 includes controllers for storing and retrieving data from memory 304M and external memory such as OTT receiver memory 206. System interfaces 314 may include Joint Test Action Group (JTAG) interfaces and power management interfaces. Video and audio input modules 306 IV and 306 IA perform preprocessing functions on video and audio data, respectively, as required for incoming signals from wireless connectivity 208A and wired connectivity 208B, such as demultiplexing and demodulation, while video output module 308OV. Audio output module 308OA perform output processing required for the output of data via wireless connectivity 208A or wired connectivity 208B. The OTT receiver memory stores information used or produced by the SoC 202. The foregoing elements are also typically present in a hybrid STB/OTT receiver, however, some elements such as wireless and wired connectivity 208 may be shared.

The OS Application Environment 304 includes a processor 304P, and a memory 304M communicatively coupled to the processor 304P, where the memory 304M stores at least some processor 304P instructions for implementing media content 102 playback applications 312 (other instructions may be stored in or retrieved from other memory). The OS Application Environment 304 includes or implements a secure processing module such as a TEE 3044S.

As described above, the TEE 304S may include a "secure" processor (not shown) running its own operating system and having its own memory that cannot be accessed (written to and/or read from) by the processor 304P used for non-secure operations. Alternatively, the TEE 304S may be implemented by use of processor 304P running a "rich" operating system (OS), but with specific commands only permitted to run on a secure OS of the TEE 304S instead of the rich OS. This secure OS is smaller and more confined than the rich OS, and may for example (1) permit only particular applications to be run by the secure OS, (2) restricting read and/or write operations to use secure resources 304SR such as a secure memory to only particular applications and only via the secure OS, or (3) permitting only a certain limited set of operations (e.g. trusted functions 304SF) to be performed. This can be implemented by a TEE application program interface (API) 304API that communicates with a complementary API implemented by processor 304P and memory 304M.

Figure 4:
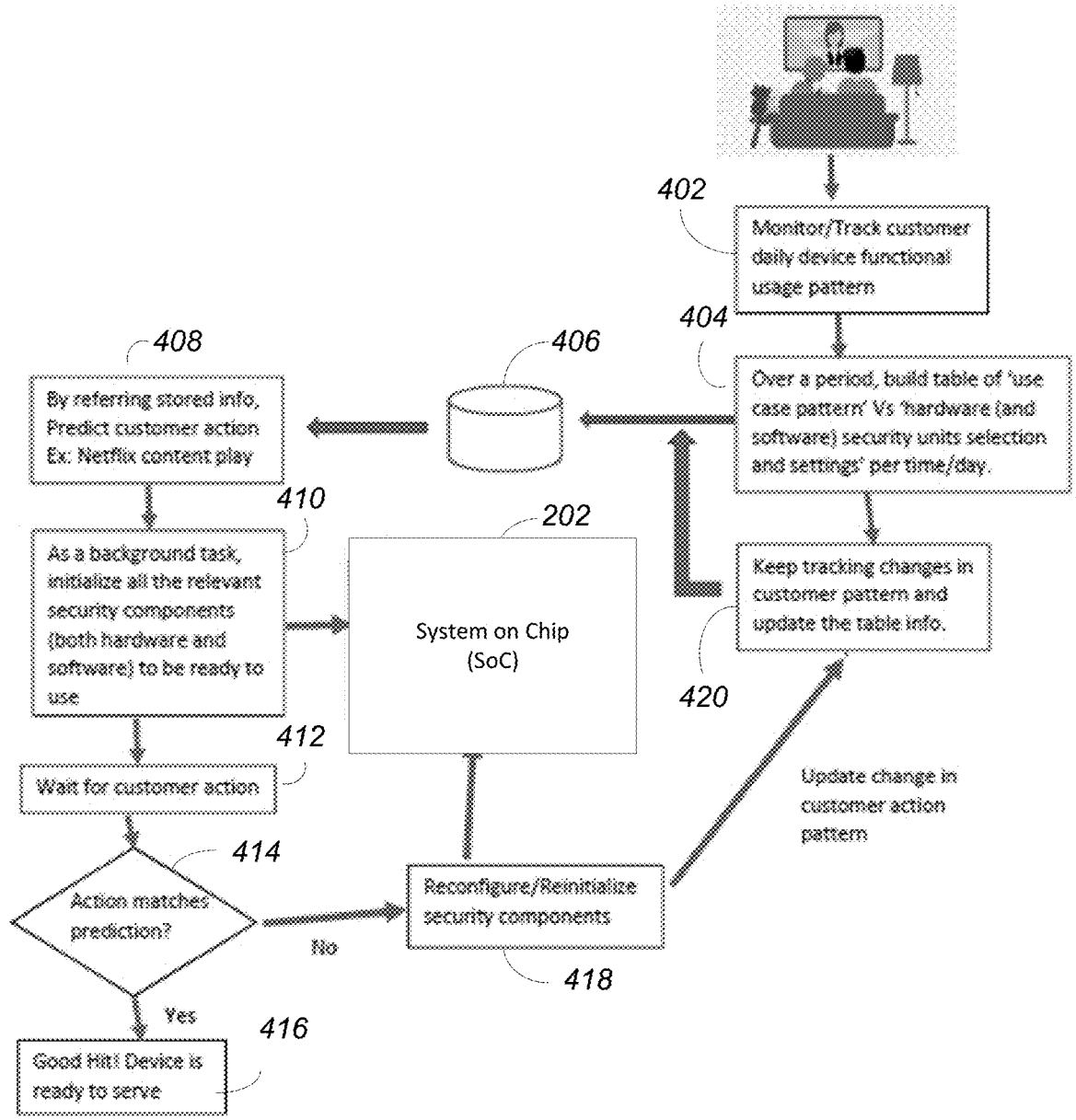
FIG. 4 is a diagram summarizing the management of processor.

FIG. 4 is a diagram summarizing the management of processor 304P resources. In block 402, the CPE 108 or trusted application 312 usage pattern for the customer is monitored or tracked. Over a period of time, this information is used to build a table that includes the usage the CPE 108 or trusted applications 312 and execution parameters such as processor 304P resources that were invoked and used by the CPE/applications 312 during such usage, as shown in block 404. Such processor 304P resources may include hardware resources such as secure resources 304SR, and/or software resources such as the API 304API and trusted functions 304TF depicted in FIG. 3. This information is stored in memory 406.

In block 408, this stored execution parameters are used to predict when trusted applications 312 will be executed, and the processor resources required to respond to such execution. In one embodiment, the monitored/stored execution parameters are as simple as which trusted applications 312 are invoked and when they are invoked. In this case, the CPE 108 determines which processor resources are required by that trusted application 312. In embodiments where the monitored execution parameters include hardware and/or software resources themselves and when they are invoked, the prediction of which resources are required can be obtained directly from stored data.

In block 410, the resources (including relevant hardware and software resources are initialized so that they are available and ready to use at the predicted time. This task can be performed as a background task by processor 304P. After waiting for customer action as shown in block 412, block 14 determines whether the predicted application began execution at the predicted time. If so, the required resources are initialized and ready for use, as shown in block 416. After a suitable waiting period, if the trusted application 312 is not executed as predicted, block 418 reconfigures and reinitializes to make them available for other trusted applications 312 or software components. This information is also used to update changes in stored execution parameters as shown in block 420.

Using the foregoing techniques, the hardware security (DRM) units are configured/initialized differently for various customer use cases. Even the set of hardware (and software) components to be used also differ for each use case. Examples of such components include the TEE where TAs 312 such as NETFLIX, PLAYREADY, WIDEVINE and HDCP are executed, secure video paths (SVPs), and key slots (hardware components used to decrypt content using a valid key. Examples of different context use cases include (1) NETFLIX content playback, (2) YOUTUBE content playback, (3) VMDS (VERIZON Digital Media Service) Video on Demand (VOD)/Live content playback, (4) tuning to live cable or satellite channels, and (5) streaming video content to in-home devices such as an iPad or other tablet device, cellphone or other mobile clients.

Figure 5A:
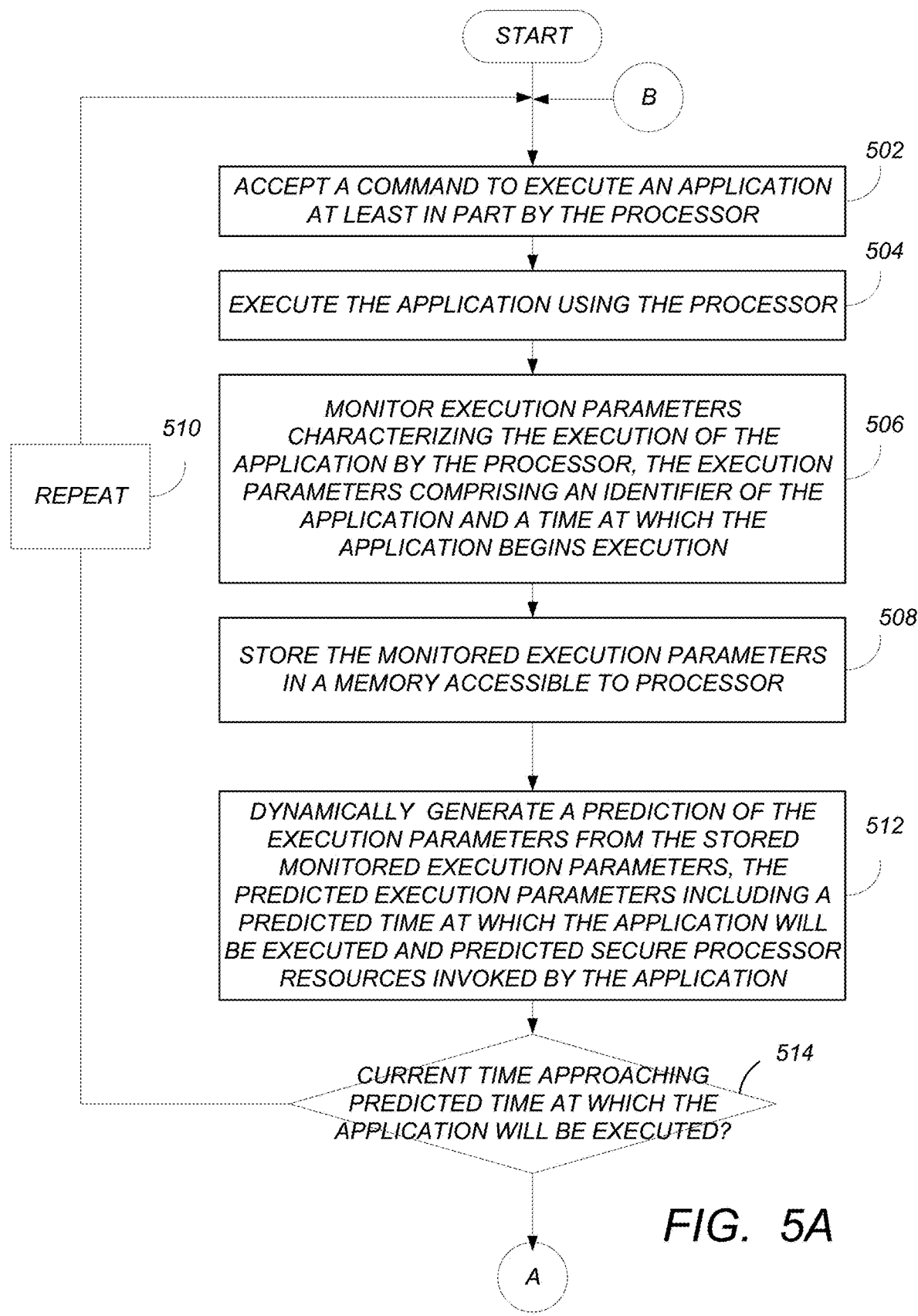
FIGS. 5A and 5B are diagrams illustrating, in further detail, exemplary operations that can be performed to manage processor resources.
Figure 5B:
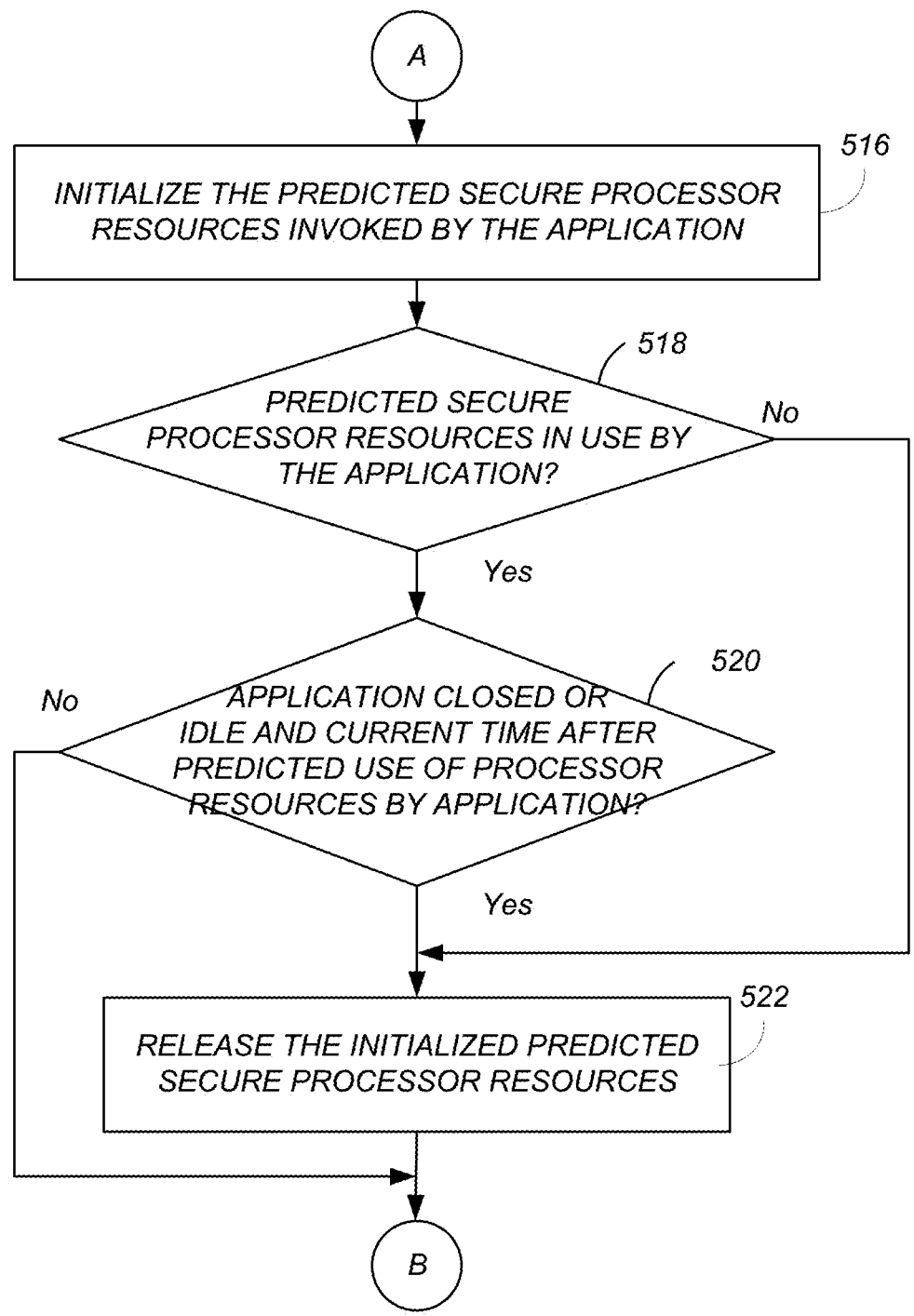

FIGS. 5A and 5B are diagrams illustrating, in further detail, exemplary operations that can be performed to manage processor 304P resources such as secure resources 304SR. In block 502, a command is accepted that causes execution of an application 312 at least in part by the processor 304P. For example, a user may determine that they wish to view a title of media content 102, and enter a command into the CPE 108 to view such content. In another example, another application executing in the CPE 108 may issue a command that invokes the application 312.

The application 312 may comprise digital rights management (DRM) trusted application such as MICROSOFT's PLAYREADY, WIDEVINE—used by CHROME, FIREFOX and OPERA, FAIRPLAY—used by SAFARI in APPLE OS/X operating systems, High Bandwidth Digital Content Protection (HDCP), available from the INTEL Corporation), or Digital Transmission Content Protection (DTCP).

In block 504, the application 312 is executed, at least in part using the processor 304P (other processors, for example processors in the OTT receiver 108O but external to the SoC 202 may also perform some of the operations in the execution of the application 312.

In block 506, execution parameters that characterize the execution of the application 312 by the processor 304P are monitored. In one embodiment, such execution parameters include an identifier of the application 312 being executed, and a temporal value (e.g. clock time and date or other measure of time) indicating when the application begins execution. In other embodiments, the execution parameters can include any combination of the processor resources used in executing the application 312 and the time that the application ends execution of the application 312. Such processor resources may include, for example, a secure processor resources 304SR including a secure processor memory, which may include one or more key slots for securely storing keys for use by the application 312 to decrypt the requested media content 102. Secure processor resources 304SR may also include a secure video path (SVP). The SVP is a hardware feature comprised of pipelining different hardware components involved in video flow, and configuring those resources to work in a secure mode. An SVP is analogous to a secure tunnel for video flow, where the data cannot be tapped, and only TAs can use the data. In one embodiment, the execution parameters also includes a temporal value indicating when the application completes execution.

In block 508, the monitored execution parameters are stored in a memory accessible to the processor 304P. For example, the execution parameters may be stored in memory 304M, 206, or in a memory remote from the CPE 108 (in the cloud or on a server accessible by the CPE). In one embodiment, the monitored execution parameters are stored in a data structure such as a table that relates the user, the identifier of each of the application and the times at which each of the applications begins and ends execution. For example, such as in the "Customer Usage Chart" shown below:

TABLE I

Exemplary Monitored Execution Parameters

| Customer usage pattern on Gateway/CPE | Date/Time | DRM resources |
|---|---|---|
| Watching Cable channels | Everyday 2 pm to 5 pm | TA: HDCP KeySlots: 7 |
| NETFLIX playback | Weekdays- 4 pm to 7 pm | TA: NETFLIX, HDCP KeySlots: 4 |
| In-home video streaming to clients like IPAD, mobiles | Weekend 9 am to 4 pm | TA: DTCP KeySlots: 4 |
| YouTube 4K content play using WIDEVINE DRM | Sunday 9 am to 11 am | TA: HDCP KeySlots: 3 |

Hence, customer activities of application usage (especially apps which use DRM resources like Key Slots and trusted applications or TAs 312) or functional use case, are tracked and chart of 'time/day' vs. 'Application/Use-Case+ DRM resource profile' is created. Over a period of time, a table such as depicted above is fully developed or stable unless customer changes his usage pattern.

As described above, the number and/or capacity of available secure resources 304SR is limited. For example, the number of secure key slots and size of secure memory space for use by TAs 312 is limited. It is typically infeasible to keep all TAs 312 loaded in memory and reserving key slots unless the number of key slots and the secure memory size is increased to be sufficient to concurrently support all TAs 312. This would unnecessarily increase the cost of the CPE. Since it is unusual for all of the TAs 312 to be executing at the same time, it is beneficial to load/unload TAs 312 (and reserving the secure resources needed to execute them) based on expected use of such TAs 312 based on customer usage patterns. This allows for efficient use of processor 304P resources such as secure resources 304SR, including secure memory space and key slots. The monitored and stored execution parameters such as those presented in Table I provides information about which TAs 312 are most likely to be used on a temporal basis, and can be used by the CPE 108 using algorithms or logic to load/unload TAs 312 to permit effective use of processor 304P resources.

Referring back to FIG. 5A, in block 512, a temporal prediction of the execution parameters is generated from the stored monitored execution parameters. This prediction can be generated dynamically (e.g. on a substantially constant basis), or can be generated periodically, aperiodically. The predicted execution parameters include a predicted time at which the application will be executed and predicted processor resources (such as secure resources 304SR) that are invoked by the application 312.

Further, the monitored execution parameters themselves can be used to predict when an updated prediction is generated. For example, if the monitored execution parameters indicate that the TAs 312 are never executed at early morning hours, the prediction can be generated during such hours, so as to conserve processing resources and to assure that an updated prediction is generated before one or more users are likely to invoke TAs 312 in the CPE 108 to view content.

Block 514 determines whether the current time is approaching the predicted time at which the application will be executed and the processor resources will be required. For example, if the application is predicted to be executed at 4 PM, and that time is N minutes away, block 514 would test true and processing routed to block 516. The time period N before the predicted execution time can be a time period determined by the time it takes the application to start up and initialize the required resources. This time period may be reasonably constant, or may vary by application or how busy the CPE 108 is with other applications. In one embodiment, the monitored execution parameters include the time it takes for the trusted application 312 to reserve or invoke the secure processor resources 304SR and may also include information including which other applications were active. This information can be used to determine precisely when the operations of block 514 are performed (e.g. how long before the predicted execution time of the trusted application 312 the secure resources 304SR should be invoked so they are available for the trusted application 312 when needed).

The time period N may also be based on the uncertainty in the predicted time at which the application is expected to be executed. For example, the application may be executed at 3:58 one day, at 3:55 on another day and at 3:56 on another day. This data can be used to determine the variance of the predicted time the application will be executed, and the time period N selected to assure adequate start up time to a particular confidence, or to select the most probable time. Further, the time period N may be chosen also depending upon how many processor resources are currently available. For example, if no other application is being executed and all of the processor resources are available, needed resources may be reserved further in advance than would be the case if some or all of the processor resources were in use by other applications.

In a further embodiment, the predictions generated in block 512 are further based a comparison of predicted execution parameters with actual execution parameters. This permits the CPE 108 to update the algorithms that are used to predict execution parameters or to establish an error bounds for the predicted execution parameters, and permits generation of an estimate of the confidence interval of the estimate. For example, until the stored monitored execution parameters have a sufficient number of samples (for example, taken over a sufficient period of time), it is likely that there will be significant errors in the generated predicted execution parameters. When the difference between predicted execution parameters and actual execution parameters are unacceptably large, the operations of block 514 can be suspended until such differences are reduced to acceptable values.

As shown in block 514, if the current time is sufficiently close to the time at which the application is predicted to be executed, block 514 routes processing to block 516. Otherwise, processing is routed to block 502 via block 510, and the foregoing operations are repeated.

In block 516, before the predicted time at which the application 312 is executed, the CPE 108 initializes the secure processor resources 304SR predicted to be invoked by the application. Such initialization can include reserving secure processor resources 304SR such as key slots and secure memory sufficient to execute the trusted application 312.

After a further period of time (e.g. M minutes), block 518 determines whether the predicted processor resources are in fact in use by the application. If the predicted processor resources are not in use, processing is routed to block 522, which releases the initialized processor resources, so that they are available for other applications. The period of time M may also be determined using a variance in the difference between the predicted execution time and the actual execution time, so that it can be ascertained with reasonably high confidence that if the application is not executing, it is because the customer has elected not to execute the application at all, not simply because such execution was delayed. If the predicted secure processor resources are in use by the application, processing is routed to block 520, which determines if the application has closed or if the application is idle and the current time is after the predicted use of processor resources by the application. If so, the initialized resources are released, as shown in block 522. Otherwise, processing is routed back to block 502.

Hence, as per customer pattern information gathered blocks 506 and 508, inactive DRM resources are released or unloaded, and anticipated DRM resources as per customer usage patterns are loaded and kept ready for fast launch of user application or functional use cases.

Execution parameters may include an identifier of the user or customer that invoked the application (or who was logged in to the CPE) when the application was invoked. This identifier may be stored with the other execution parameters, and used to determine when to reserve processor 304P resources on a per-customer basis. For example, referring to Table I, it could be that the first column ("Watching Cable Channels") occurs every day from 2 PM to 5 PM, but only when a first user is logged into the CPE 108. Using this information, the system will reserve processor 304P resources required to execute the HDCP TA 312 and reserve 7 key slots if this first user is logged in, but not do so if another user is logged in.

Hardware Environment

Figure 6:
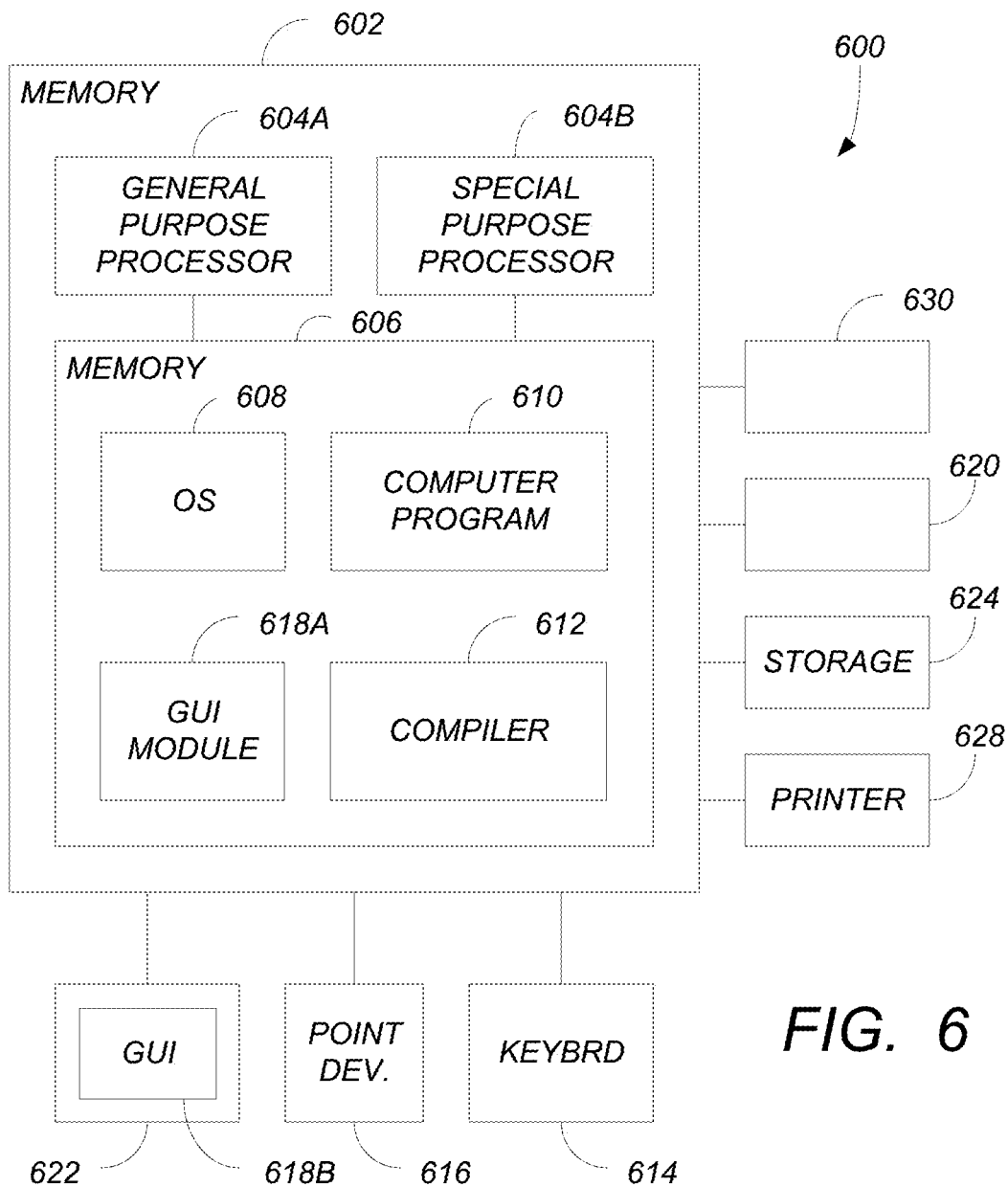
FIG. 6 illustrates an exemplary computer system that could be used to implement processing elements of the system for managing processor resources.

FIG. 6 illustrates an exemplary computer system 600 that could be used to implement processing elements of the above disclosure, including the gateway 107, OTT receiver 108O, computer 108C or hybrid. The computer 602 comprises a processor 604 and a memory, such as random access memory (RAM) 606. The computer 602 is operatively coupled to a display 622, which presents images such as windows to the user on a graphical user interface 618B. The computer 602 may be coupled to other devices, such as a keyboard 614, a mouse device 616, a printer 628, etc. Of course, those skilled in the art will recognize that any combination of the above components, or any number of different components, peripherals, and other devices, may be used with the computer 602.

Generally, the computer 602 operates under control of an operating system 608 stored in the memory 606, and interfaces with the user to accept inputs and commands and to present results through a graphical user interface (GUI) module 618A. Although the GUI module 618B is depicted as a separate module, the instructions performing the GUI functions can be resident or distributed in the operating system 608, the computer program 610, or implemented with special purpose memory and processors. The computer 602 also implements a compiler 612 which allows an application program 610 written in a programming language such as COBOL, C++, FORTRAN, or other language to be translated into processor 604 readable code. After completion, the application 610 accesses and manipulates data stored in the memory 606 of the computer 602 using the relationships and logic that was generated using the compiler 612. The computer 602 also optionally comprises an external communication device such as a modem, satellite link, Ethernet card, or other device for communicating with other computers.

In one embodiment, instructions implementing the operating system 608, the computer program 610, and the compiler 612 are tangibly embodied in a computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of instructions which, when read and executed by the computer 602, causes the computer 602 to perform the operations herein described. Computer program 610 and/or operating instructions may also be tangibly embodied in memory 606 and/or data communications devices 630, thereby making a computer program product or article of manufacture. As such, the terms "article of manufacture," "program storage device" and "computer program product" as used herein are intended to encompass a computer program accessible from any computer readable device or media.

To the extent that terms "includes," "including," "has," "contains," and variants thereof are used herein, such terms are intended to be inclusive in a manner similar to the term "comprises" as an open transition word without precluding any additional or other elements. The term ""exemplary" is used herein to mean serving as an example, instance, or illustration and is not necessarily to be construed as preferred or advantageous.

The foregoing discloses a method, apparatus, and system for managing processor resources. One embodiment is evidenced by (a) accepting a command to execute an application at least in part by the processor; (b) executing the application using the processor; (c) monitoring execution parameters characterizing the execution of the application by the processor, the execution parameters including an identifier of the application and a time at which the application begins execution; and (d) storing the monitored execution parameters in a memory accessible to processor.

Implementations may include one or more of the following features:

The method above wherein the monitored execution parameters further include: processor resources used to execute the application.

Any of the methods described above wherein: the processor includes a secure processor module having a trusted execution environment; and the processor resources include a secure processor module resources including a secure processor module memory.

Any of the methods described above, wherein the secure processor memory includes one or more least one key slot and a secure video path, the key slots for securely storing keys for use by the application to decrypt content.

Any of the methods described above, wherein the application includes a trusted digital rights management application executed by the secure processor module.

Any of the methods described above, wherein the trusted drm application is selected from a group including: high bandwidth digital content protection; digital transmission content protection; playready; and widevine.

Any of the methods described above, wherein the execution parameters further include: a time at which the application ends execution.

Any of the methods described above, wherein: the command is accepted from a user; and the method further includes the steps of: repeating steps (a)-(d) for a plurality of executions of a plurality of applications by a plurality of users.

Any of the methods described above, wherein the monitored execution parameters are stored in a table relating the user, the identifier of each of the applications and the times at which each of the applications begins and ends execution.

Any of the methods described above, wherein the table further includes secure processor module resources invoked by the associated applications at the associated times.

Any of the methods described above, wherein the memory in which the monitored execution parameters are stored is external to the secure processor module.

Any of the methods described above, further including: dynamically generating a prediction of the execution parameters from the stored monitored execution parameters, the predicted execution parameters including a predicted time at which the application will be executed and predicted secure processor resources invoked by the application; and before the predicted time at which the application will be executed, initializing the predicted secure processor resources invoked by the application.

Any of the methods described above, wherein the predicted time at which the application will be executed is a most probable time that the application will be executed based on the plurality of executions of a plurality of applications.

Another embodiment is evidenced by an apparatus for receiving content and providing content for presentation. The apparatus includes: a processor; a memory, communicatively coupled to the processor, the memory storing processor instructions including processor instructions for: (a) accepting a command to execute an application for providing the content for presentation, the application executed at least in part by the processor; (b) executing the application using the processor; (c) monitoring execution parameters characterizing the execution of the application by the processor, the execution parameters including an identifier of the application and a time at which the application begins execution; and (d) storing the monitored execution parameters in the memory.

Implementations may include one or more of the following features.

The apparatus described above wherein the monitored execution parameters further include: processor resources used to execute the application.

Any apparatus described above, wherein: the processor includes a secure processor having a trusted execution environment; and the processor resources include a secure memory.

Any apparatus described above, wherein the secure memory includes one or more least one key slot and a secure video path, the key slots for securely storing keys for use by the application to decrypt content.

Any apparatus described above, wherein the application includes a trusted digital rights management application executed by the secure processor.

Any apparatus described above, wherein the trusted drm application is selected from a group including: high bandwidth digital content protection); digital transmission content protection; and a conditional access system application.

Any apparatus described above, wherein the execution parameters further include: a time at which the application ends execution.

Any apparatus described above, wherein: the command is accepted from a user; and the processor instructions further include processor instructions for repeating steps (a)-(d) for a plurality of executions of a plurality of applications by a plurality of users.

Any apparatus described above, wherein the monitored execution parameters are stored in a table relating the user, the identifier of each of the applications and the times at which each of the applications begins and ends execution.

Any apparatus described above, wherein the table further includes secure processor resources invoked by the associated applications at the associated times.

Any apparatus described above, wherein the memory in which the monitored execution parameters are stored is external to the secure processor module.

Any apparatus described above, wherein the processor instructions further include: dynamically generating a prediction of the execution parameters from the stored monitored execution parameters, the predicted execution parameters including a predicted time at which the application will be executed and predicted secure processor resources invoked by the application; and initializing the predicted secure processor resources invoked by the application before the predicted time at which the application will be executed.

Any apparatus described above, wherein the predicted time at which the application will be executed is a most probable time that the application will be executed based on the plurality of executions of a plurality of applications.

Another embodiment is evidenced by an apparatus for managing resources of a processor, including: (a) means for accepting a command to execute an application at least in part by the processor; (b) means for executing the application using the processor; (c) means for monitoring execution parameters characterizing the execution of the application by the processor, the execution parameters including an identifier of the application and a time at which the application begins execution; and (d) means for storing the monitored execution parameters in a memory accessible to processor. The apparatus may also include a digital rights management system resource manager.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of managing, for playback of media content, one or more resources of a processor of a device, comprising:
   (a) accepting a command from a user to execute an application of one or more applications at least in part by the processor, wherein the application is associated with playback of the media content;
   (b) executing the application using the processor, wherein the application is associated with at least one of the one or more resources;
   (c) monitoring execution parameters characterizing the execution of the application by the processor for the user, the execution parameters comprising an identifier of the application and a time at which the application begins execution, wherein monitoring comprises building a table that includes usage of the device, usage of the one or more applications, and the execution parameters;
   (d) storing the monitored execution parameters in a memory accessible to the processor; and
   reserving the at least one resource sufficient to execute the application based on an expected use of the application, wherein when to reserve the at least one resource is based on at least one of the execution parameters, and wherein the at least one resource comprises one or more key slots.

2. The method of claim 1, wherein the monitored execution parameters further comprise:
   processor resources used to execute the application.

3. The method of claim 2, wherein:
   the processor comprises a secure processor having a trusted execution environment; and
   the processor resources comprise a secure memory.

4. The method of claim 3, wherein the secure memory comprises the one or more key slots and a secure video path (SVP), the one or more key slots for securely storing one or more keys for use by the application to decrypt content.

5. The method of claim 4, wherein the application includes a trusted digital rights management (DRM) application executed by the secure processor.

6. The method of claim 5, wherein the trusted DRM application is selected from a group comprising:
   high bandwidth digital content protection (HDCP);
   digital transmission content protection (DTCP);
   playready; and
   widevine.

7. The method of claim 1, wherein the execution parameters further include:
   a time at which the application ends execution.

8. The method of claim 1, wherein:
   the method further comprises the steps of:
      repeating steps (a)-(d) for a plurality of executions of a plurality of applications by a plurality of users.

9. The method of claim 8, wherein the monitored execution parameters are stored in a table relating the user, the identifier of each of the applications and the times at which each of the applications begins and ends execution.

10. The method of claim 9, wherein the table further comprises secure processor module resources invoked by the associated applications at the associated times.

11. The method of claim 10, wherein the memory in which the monitored execution parameters are stored is external to the secure processor module.

12. The method of claim 1, further comprising:
   dynamically generating a prediction of the execution parameters from the stored monitored execution parameters, the predicted execution parameters including a predicted time at which the application will be executed and predicted secure processor resources invoked by the application; and
   before the predicted time at which the application will be executed, initializing the predicted secure processor resources invoked by the application.

13. The method of claim 12, wherein the predicted time at which the application will be executed is a most probable time that the application will be executed based on the plurality of executions of a plurality of applications.

14. An apparatus for managing one or more resources of a device, for playback of media content, comprising:
   a processor, wherein the one or more resources are of the processor;
   a memory, communicatively coupled to the processor, the memory storing processor instructions comprising processor instructions for:
      (a) accepting a command from a user to execute an application of one or more applications, wherein the application is associated with playback of the media content;
      (b) executing the application using the processor, wherein the application is associated with at least one of the one or more resources;
      (c) monitoring execution parameters characterizing the execution of the application by the processor for the user, the execution parameters comprising an identifier of the application and a time at which the application begins execution, wherein monitoring comprises building a table that includes usage of the device, usage of the one or more applications, and the execution parameters;
      (d) storing the monitored execution parameters in the memory; and
      reserving the at least one resource sufficient to execute the application based on an expected use of the application, wherein when to reserve the at least one resource is based on at least one of the execution parameters, and wherein the at least one resource comprises one or more key slots.

15. The apparatus of claim 14, wherein the monitored execution parameters further comprise:
   processor resources used to execute the application.

16. The apparatus of claim 15, wherein:
   the processor comprises a secure processor having a trusted execution environment; and
   the processor resources comprise a secure memory.

17. The apparatus of claim 16, wherein the secure memory comprises the one or more key slots and a secure video path (SVP), the one or more key slots for securely storing one or more keys for use by the application to decrypt content.

18. The apparatus of claim 17, wherein the application includes a trusted digital rights management (DRM) application executed by the secure processor.

19. The apparatus of claim 18, wherein the trusted DRM application is selected from a group comprising:

high bandwidth digital content protection (HDCP);
digital transmission content protection (DTCP); and
a conditional access system application.

20. The apparatus of claim 14, wherein the execution parameters further include:
a time at which the application ends execution.

21. The apparatus of claim 14, wherein:
the processor instructions further comprise processor instructions for repeating steps (a)-(d) for a plurality of executions of a plurality of applications by a plurality of users.

22. The apparatus of claim 21, wherein the monitored execution parameters are stored in a table relating the user, the identifier of each of the applications and the times at which each of the applications begins and ends execution.

23. The apparatus of claim 22, wherein the table further comprises secure processor resources invoked by the associated applications at the associated times.

24. The apparatus of claim 16, wherein the memory in which the monitored execution parameters are stored is external to the secure memory.

25. The apparatus of claim 14, wherein the processor instructions further comprise:
dynamically generating a prediction of the execution parameters from the stored monitored execution parameters, the predicted execution parameters including a predicted time at which the application will be executed and predicted secure processor resources invoked by the application; and
initializing the predicted secure processor resources invoked by the application before the predicted time at which the application will be executed.

26. The apparatus of claim 25, wherein the predicted time at which the application will be executed is a most probable time that the application will be executed based on the plurality of executions of a plurality of applications.

27. An apparatus for managing, for playback of media content, one or more resources of a device using a processor of the apparatus, comprising:
(a) means for accepting a command from a user to execute an application of one or more applications at least in part by the processor, wherein the application is associated with playback of the media content;
(b) means for executing the application using the processor, wherein the application is associated with at least one of the one or more resources;
(c) means for monitoring execution parameters characterizing the execution of the application by the processor for the user, the execution parameters comprising an identifier of the application and a time at which the application begins execution, wherein monitoring comprises building a table that includes usage of the device, usage of the one or more applications, and the execution parameters;
(d) means for storing the monitored execution parameters in a memory accessible to processor; and
reserving the at least one resource sufficient to execute the application based on an expected use of the application, wherein when to reserve the at least one resource is based on at least one of the execution parameters, and wherein the at least one resource comprises one or more key slots.

* * * * *